United States Patent
Locke et al.

[11] 3,861,787
[45] Jan. 21, 1975

[54] LASER MIRROR

[75] Inventors: Edward V. Locke, Rockport; Richard A. Hella, Andover, both of Mass.

[73] Assignee: Avco Everett Research Laboratory, Inc., Everett, Mass.

[22] Filed: Aug. 29, 1973

[21] Appl. No.: 392,622

[52] U.S. Cl.................. 350/288, 350/61, 350/310, 331/94.5 T
[51] Int. Cl. ............................................. G02b 5/08
[58] Field of Search ............ 350/288, 299, 310, 61, 350/63, 93; 331/94.5

[56] References Cited
UNITED STATES PATENTS

| | | | |
|---|---|---|---|
| 3,297,491 | 1/1967 | Kolenko | 350/93 |
| 3,488,110 | 1/1970 | Evoy | 350/310 |
| 3,637,296 | 1/1972 | McLafferty | 350/310 |
| 3,645,608 | 2/1972 | Staley | 350/310 |
| 3,731,992 | 5/1973 | Mansell | 350/310 |

*Primary Examiner*—Ronald L. Wibert
*Assistant Examiner*—Michael J. Tokar
*Attorney, Agent, or Firm*—Charles M. Hogan; Melvin E. Frederick

[57] ABSTRACT

A laser mirror has an annular form and a plurality of concentric annular cooling passages internally thereof within about 1/10 inch of the mirror surface thereof. The apparatus has a box-beam rigid construction built around the cooling passages, a cooled inner supporting lip for a central cooperating mirror and a sealing back plate on its rear surface. The apparatus design is tolerant of a wide variety of forces.

5 Claims, 4 Drawing Figures

PATENTED JAN 21 1975    3,861,787

LASER MIRROR

BACKGROUND OF THE INVENTION

The present invention relates to mirrors for high power laser cavities and more particularly to maintaining such mirrors free from distortion under conditions of thermal stress and normal use and handling.

High power lasers of the class involved in the present invention are exemplified by the high power laser shown in the copending application of Edward V. Locke and Richard A. Hella, Ser. No. 322,783 filed Jan. 11, 1973 now U.S. Pat. No. 3,817,606 issued June 18, 1974, of common assignment with the present application and the disclosure of which is incorporated herein by reference as though set out at length herein.

For a further discussion of a laser capable of developing very high powers, see, for example, U.S. Pat. No. 3,577,096, issued May 4, 1971. See, also, U.S. Pat. No. 3,713,030, issued Jan. 23, 1973 and U.S. Pat. No. 3,702,973 and assigned to the same Assignee as this application. U.S. Pat. No. 3,577,096 discloses a transverse discharge type high power flowing gas laser; U.S. Pat. No. 3,713,030 discloses a gas laser wherein the gas is thermally heated and thereafter suddenly cooled by passing it through a rapid expansion nozzle to freeze the vibrational energy states; and U.S. Pat. No. 3,702,973 of common assignment with the present invention discloses a transverse discharge high power flowing gas device using an electron beam.

Such lasers may comprise one or more annular mirror portions. All of the annular and non-annular mirror portions require adequate cooling under the conditions of laser operation to prevent thermal erosion modifications of the mirror surfaces and to prevent distortion-inducing rises of mirror temperature through excessive absorption of heat in relation to heat removed therefrom.

In the field of lasers, it has long been known that the alignment and optical figure of the mirrors are of critical importance in order to maintain maximum output. Frequently, laser mirrors after being correctly aligned and particularly mirrors used in chemical reaction and gas lasers wherein they are exposed to hot gases as described above are subjected to radiative and aerodynamic heating which cause misalignment and distortion.

If one surface of a laser mirror is exposed to a uniform heat flux resulting, for example, from radiative and/or aerodynamic heating, conduction produces a temperature gradient in the material normal to its exposed surface. In the absence of external restraint the differential thermal expansion results in spherical bending. Where a high quality optical system is required, surface distortion must not be greater than a small fraction of the wavelength of the radiation of, for example, about 10 percent at the most. In certain gas laser systems, distortion should be kept at a value less than preferably one, or at most, several microns. Gas lasers such as, for example, gas dynamic and electrically pumped $CO_2$ lasers are capable of extremely high output powers if mirror distortion does not limit obtainable power output.

It is therefore an important object of the invention to provide such mirror cooling.

It is a further object of the invention to maintain mirror structural integrity consistent with the preceding object.

It is a further object of the invention to avoid coolant leakage consistent with one or both of the preceding objects.

It is a further object of the invention to accommodate effective interfacing between central and annular cooperating mirror portions.

It is a further object of the invention to accommodate conventional mirror surface finishing and other manufacturing techniques consistent with one or more of the preceding objects.

It is a further object of the invention to accommodate a variety of mirror surface profiles consistent with one or more of the preceding objects.

It is a further object of the invention to maintain the design freedom of the mirror material selection and other design features consistent with one or more of the preceding objects.

SUMMARY OF THE INVENTION

The invention is particularly applicable to annular mirror portions of the laser, but may be utilized in other mirror portions as well. Describing it in terms of its application to an annular mirror, a mirror blank is selected as a Rockwell scale B30 hardness metal ring, preferably made of OFHC copper, affording the desired characteristics of hardness and high thermal conductivity and heat capacity for mirror polishing and maintenance of mirrored surface and mirror body properties during high power laser usage. The ring has a forward face which is ultimately to be worked to provide the mirror surface and an opposing back face. Two concentric annular grooves are formed in the ring starting from the back face by machining slowly so as not to introduce stresses in the material or annealing levels of heating therein.

The grooves are concentric with each other and their axis preferably coincides with the mirror axis, but may be displaced therefrom. The basis of the grooves are within about 1/10 inch of the forward surface. Rings are inserted into the grooves and extend to less than the full depth thereof to provide annular passages just below the rings, preferably of square cross-section. The rings have the same thickness as groove width to fit therein without stress-inducing forcing. After insertion, the rings are adhered to the groove sidewalls by electron beam welding with a weld penetration reaching between one-half and full depth of the rings. This weld penetration does not adversely effect properties of the mirror material.

These and other objects, features and advantages of the invention will be apparent from the following detailed description with reference therein to the accompanying drawings in which:

DETAILED DESCRIPTION OF PREFERRED EMBODIMENTS

Figure 1:
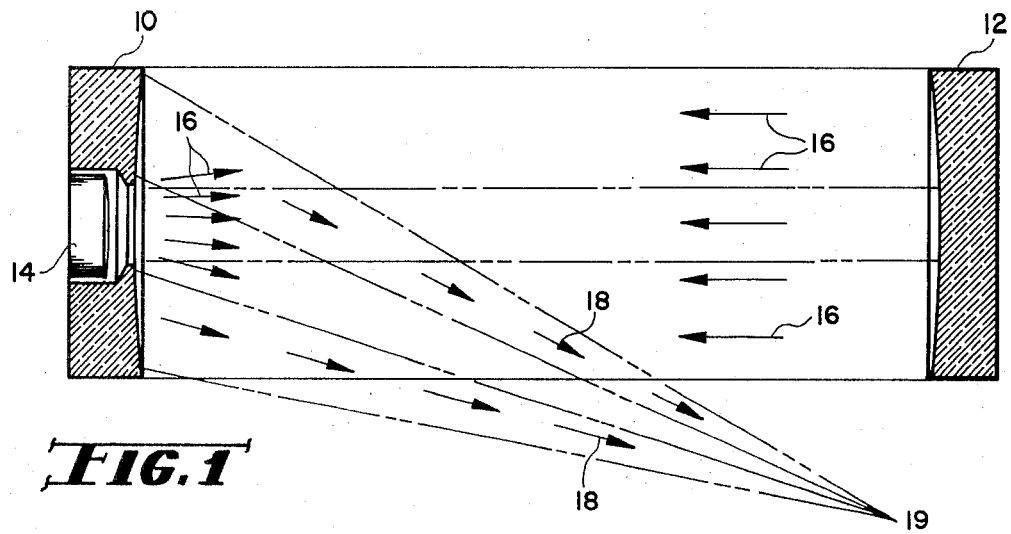
FIG. 1 is a sectional view of the resonator section of a laser including the lasing cavity and feedback and transfer mirror elements.

A high power laser's reflecting cavity comprises a transfer mirror 10 of annular form and feedback or return mirrors 12 and 14 of non-annular form. Coherent, radiant energy is reflected between the feedback mirrors in the directions indicated by the arrows 16 and by transfer mirror 10 in the direction indicated by arrows 18 and focused to a point 19.

Figures 2, 3:
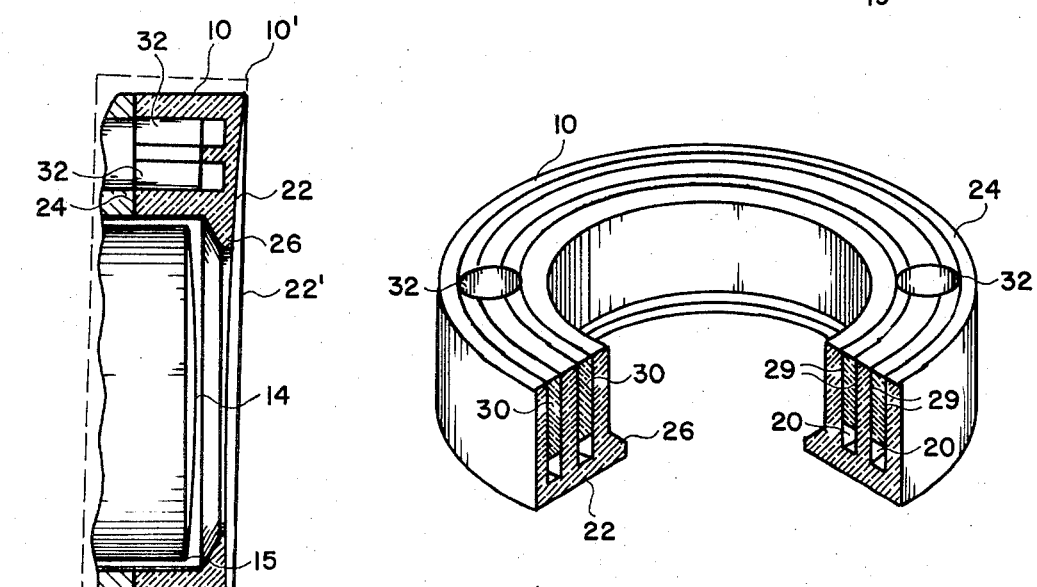
FIG. 2 is a magnified view of an annular transfer mirror surrounding a central feedback mirror.
FIG. 3 is an isometric, partly broken away and sectioned view of components of the annular mirror of FIG. 2 at an earlier stage of fabrication.

The transfer mirror 10 and feedback mirror 14 are shown in magnified form in FIG. 2 with the annular mirror 10 being sectioned. Mirror 10 comprises two cooling channels 20 which are annular and concentric with each other about an axis which coincides with the axis of mirror 10. The apparent angulation of the axis of rotation of passages 20 with respect to the axis of mirror 10 is exaggerated in FIG. 2 and in practice generally is not greater than about one or two degrees. The mirror 10 comprises a forward face surface 22 and a rear surface 24, the forward surface being profiled into a concave form, the exact bevel angle of 22 and the profiling depending upon the transfer characteristics desired. The mirror has an internal lip 26 which permits a loosening of machining tolerances for the hidden edge 15 of feedback mirror 14. This also permits mirror 14 to be formed with a diameter such that it may be adjustably mounted with respect to mirror 10.

The passages 20 are defined by annular grooves 28 back filled to a limited portion of their depths by rings 30 which are welded in place as described below.

Phantom lines 10' show the outline of an original blank used to make mirror 10. The blank 10' a rectangular cross-section with a rough machined form surface 22' as its base. The grooves 28 are machined to within 0.080 – 0.120 inch of their surface 22' and side and back walls of the blank 10' are machined to the final form shown in solid in FIG. 2 before insertion and welding of the ring plugs 30.

Figure 4:
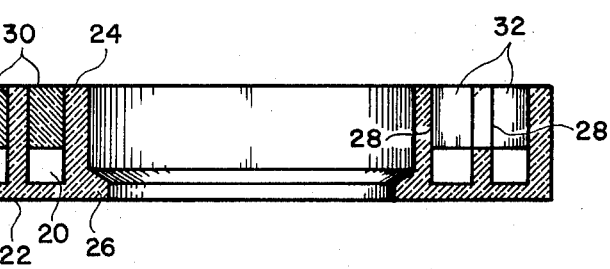
FIG. 4 is a cross-section view of the FIG. 3 apparatus within the direction indicated by the arrow 4—4 in FIG. 3.

Referring now to FIGS. 3 and 4, the rings 30 are electron beam welded in place using an electron beam welder (not shown) of conventional form and applying its beam at the four annular interfaces 29 between rings 30 and the sidewalls of grooves 28. The interfaces 29 can be fed past the beam or the beam can be swept around the regular circumferential paths of such interfaces by electrostatic or magnetic deflection. The electron beam weld has the inherent characteristic of a very limited lateral spread of the area affected by heating and the beam is controlled in accordance with the present invention to produce a weld depth from one-half to full penetration of the interfaces 29. Copper members (not shown) effective to function as heat sinks should be used during the welding operation.

Typically the passage 20 will have a depth of about 1/10–2/10 inch and a width of 1/10–2/10 inch, the tolerance on either of the dimensions being less than 0.005, and preferably less than 0.002, inch. Spacing to surface 22 from passages 20 is 0.080 – 0.120 inch plus or minus 0.005, preferably less than 0.002 inch.

Coolant supply and return holes are milled as indicated at 32 and a backing and support member 34 to facilitate mounting is electron beam welded to the back face 24 of the mirror after it is machined to final configuration. Coolant passages (not shown) are provided in backing member 34 (see FIG. 2) and are aligned with passages 32 of mirror 10. Care should be taken at this point to insure that there are no coolant leaks. After welding on the backing member 34, surface 22 is machined and optically ground and polished. After polishing the mirror 10 may be assembled with central feedback mirror 14 as indicated in FIG. 2.

Turbulence inducing strips, such as one or more of the spiral ribbons described in said application, Ser. No. 322,783, may be inserted in passages 20, e.g. as by laying them at the base of grooves 28 before inserting rings 30.

The finished product of FIGS. 1–2 affords an annular mirror with a box-beam construction around cooling passages, complete sealing integrity and no compromise with the materials and characteristics of the reflecting surface 22. The spacing between such surface and passages 20 is essentially uniform, yet resistant to distortion from pressurized coolant and affords a high rate of heat removal from surface 22.

Thermal expansion and contraction properties are uniform throughout the annular mirror.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel combination of features present in, or possessed by, the apparatus and techniques herein disclosed and limited solely by the scope and spirit of the appended claims.

What is claimed is:

1. Laser mirror apparatus comprising:
    means defining a high conductivity, high strength annular mirror with a forward reflecting surface, a back surface and at least one sidewall, said means have a plurality of annular grooves having sidewalls, said grooves being concentric with each other, closed on themselves and extending from said back surface toward said reflecting forward surface, each said groove having a base portion adjacent said reflecting forward surface; and
    annular ring means sealably disposed within and filling a portion of each groove, said ring means extending from said back surface to a point adjacent the base portion of said grooves to define with each groove an annular coolant flow passage, said ring means being welded to said groove sidewalls over a depth of one-half to full depth of said ring means whereby said means defining said mirror and said ring means are substantially integral one with another.

2. Mirror apparatus in accordance with claim 1 wherein a backing member is welded to said back face.

3. Mirror apparatus in accordance with claim 1 wherein said groove extends normal to said forward surface and at a slight angle with respect to said sidewall.

4. Mirror apparatus in accordance with claim 1 wherein an annular lip is provided at the inner front periphery of said mirror ring.

5. Mirror apparatus in accordance with claim 1 wherein
    a plurality of said passages are provided
    a backing member is welded to said back face,
    said groove extends normal to said forward surface and at a slight angle with respect to said sidewall,
    said mirror has an annular form, and
    an annular lip is provided at the inner front periphery of said mirror ring along said forward surface thereof.

* * * * *